Dec. 22, 1964  D. J. TINGLEY  3,162,522
LOADING GLASS INTO MOLDS
Filed Feb. 17, 1961
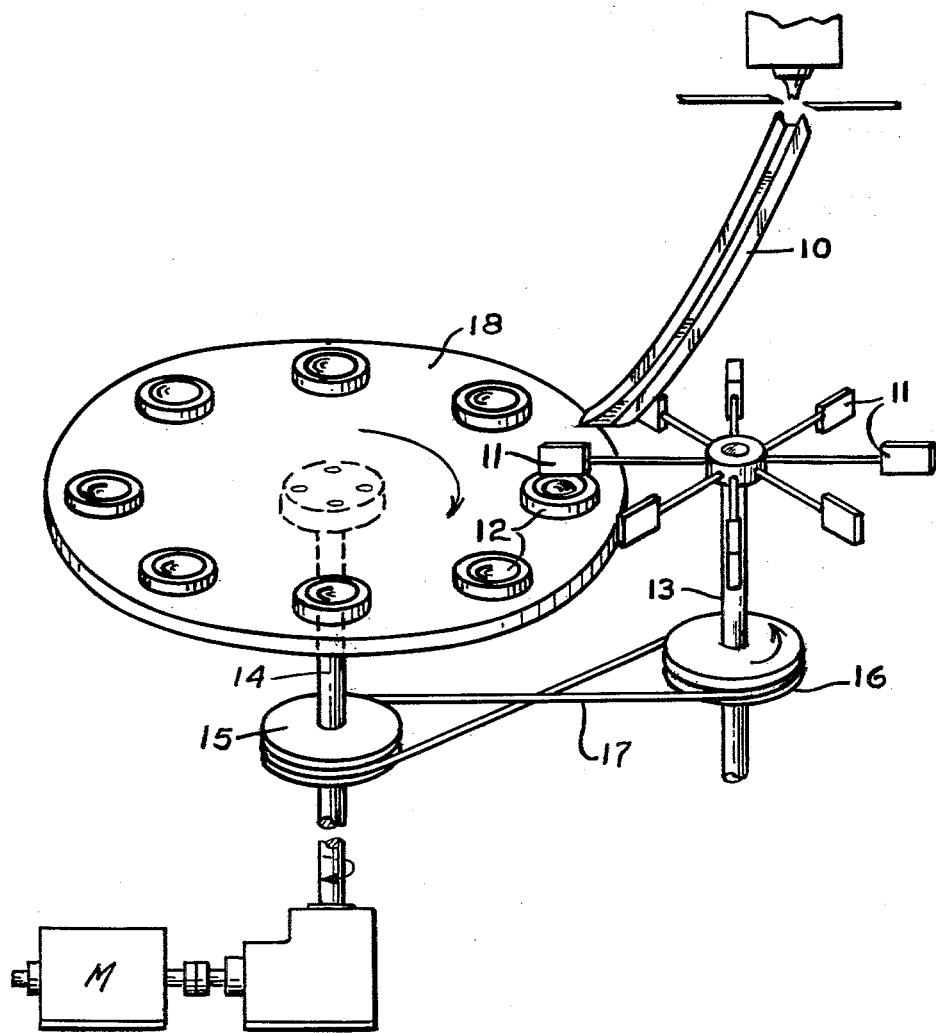
INVENTOR.
DONALD J. TINGLEY
BY
Clarence R. Patty Jr.
ATTORNEY 3,162,522
LOADING GLASS INTO MOLDS
Donald J. Tingley, Corning, N.Y., assignor to Corning Glass Works, Corning, N.Y., a corporation of New York
Filed Feb. 17, 1961, Ser. No. 89,970
2 Claims. (Cl. 65—225)

The present invention relates to the distribution of charges of molten glass and more particularly to a novel means and method for loading such charges into a series of continuously moving molds.

Molded glass articles are commonly produced by a continuous operation wherein a series of molds move through various locations where, successively, they are loaded with molten glass, the glass is pressed to conform to the mold contour, and the finished articles are removed from the molds. The molds may be caused to stop at each position, or the successive operations may be performed while the molds are in motion, the latter method generally permitting a faster rate of production. It is to operations of this latter type that the present invention is applicable.

Since the rate at which finished articles are produced depends upon the rate at which charges of molten glass are loaded into the molds, it becomes desirable to move as many molds as possible through the loading position per unit of time during the operation of the machine. The linear speed of each mold may be kept at a minimum by minimizing the distance between molds, but even with the smallest distance possible, it is necessary to move the molds at a linear speed which makes it difficult to deliver a charge at the loading position at the precise time when the mold is at that position.

It is, accordingly, an object of the present invention to provide a means for loading charges into a series of continuously moving molds which minimizes the effects of imprecise timing in the production of the charges and in their transfer to the loading position and which permits uniformly accurate deposition of such charges in the moving molds.

This object is accomplished by the provision of a loading mechanism comprising the combination of a chute, which conducts the glass charges from their source and directs them in a line generally tangential to, and in the same direction as, the path of motion of the molds at the loading position and slightly above the molds, with a series of paddles revolving in a plane between the molds and the chute and oriented so that the instantaneous velocities of their center points as they pass over the respective molds at the loading position are approximately equal to, parallel to and in the same sense as those of the center points of the molds, the paddles being adapted to contact the charges as they emerge from the chute and to retard their motion above the molds for times sufficient to permit them to drop into the molds.

The construction and operation of one embodiment of the loading mechanism of the present invention can be understood by reference to the accompanying drawing, which is a perspective view of the mechanism in position for use with a continuously rotating circular mold table.

Referring to the drawing, a charge of molten glass severed from a source according to means well known in the art is deposited at the top of chute 10. Immediately below the lower end of the chute pass a plurality of paddles 11 and below the paddles a plurality of molds 12, the paddles and mold revolving in horizontal planes about their respective axes 13 and 14. The lower end of the chute is oriented so that when the charges leave the chute, they are traveling approximately horizontally above the molds and in a line substantially tangent to the curves which describe the paths of the centers of the paddles and molds at the intersection of said curves, which is the loading position. Paddles 11 and molds 12 are spaced along their respective paths of motion so that each time a mold passes beneath the end of the chute a paddle passes under the chute and over the leading edge of the mold. Each paddle remains over its respective mold for as long as the physical configurations and paths of the mold and the paddle will permit and is preferably offset toward the forward edge of the mold in order that when a charge of molten glass, which is timed to reach the end of the chute as the mold and paddle are passing thereunder, is discharged, it will hit the paddle and fall into the center of the mold. The horizontal components of the velocities of the charges as they emerge from the chute are at least equal to and preferably greater than the velocity of the paddles, thus, the charges are impelled against the trailing edges of the paddles and are then retarded such that the horizontal component becomes equal to the linear velocity of the paddles and molds, thereby permitting the charges to drop into the molds.

For the most efficient operation of the present loading mechanism, the linear speeds of the molds and the paddles should be substantially equal. This equality will permit the paddles to travel above the respective molds for the longest time permitted by their physical configurations and their paths. Therefore, given any standard mold table, in order to determine the corresponding paddle characteristics we may proceed as follows (in the following discussion mold speeds and paddle speeds are intended to refer to the speeds of the respective center points and "radius" refers to the distance from a center point to its respective axis of revolution):

First, the linear speed of the molds which are to be loaded is determined. Since the linear speed of the paddles must equal the linear speed of the molds and is the product of the radius of the path of the paddles times their angular velocity (measured in terms of radians), it follows that this product must be a constant for any given mold table linear speed. There are, of course, an infinite number of possible combinations of paddle radius and angular velocity which will satisfy this requirement. One consideration, other than the availability of space, which should be kept in mind when choosing a combination is that, since it is desired to maintain the paddles over the respective molds for as long as practicable, and since this is possible in the illustrated embodiment only insofar as the respective paths of the molds and paddles can be considered to approximate straight lines in a small area near the loading position, it will be advantageous to utilize a paddle radius of sufficient magnitude to minimize the curvature of their path of travel and consequently its deviation from the ideal path, which is a straight line.

Next, having chosen an appropriate paddle radius and angular velocity, it remains only to determine the number of paddles which are necessary to match the mold.

Again, from the requirement that the linear speeds of the molds and paddles be equal, it can be determined that the ratio of the number of paddles to the number of molds is the same as the ratio of the paddle-path radius to the mold-path radius.

Power may be supplied to either paddle axis 13 or mold axis 14, and is transmitted by any appropriate linkage, illustrated generally in the drawing by pulleys 15 and 16 and belt 17. Although each axis could be turned by a separate power source, synchronization of the molds and the paddles is effected most simply by utilizing a single power source. In the illustrated embodiment, the ratio of the radii of the pulleys would be the inverse of the ratio of the angular velocities of their respective axes.

Paddles 11 may be of any convenient shape and need not be flat as illustrated but may, if desired, have their glass contacting trailing surfaces slightly curved in order to cause the glass charge to strike the paddle more nearly normal to its surface through a greater distance of paddle travel.

It can be seen that the paddles could equally well revolve about an axis within the radius of the mold table 18. Such an arrangement would be advantageous in that it would result in more nearly parallel mold paths and paddle paths near the loading position. On the other hand, among the disadvantages of this arrangement are the fact that the paddles would withdraw from the molds more slowly, thereby delaying the beginning of the pressing operation, and the possibility that the paddles might interfere with the pressing mechanism.

It will be clear that the loading mechanism of the present invention is equally applicable to molding operations other than those in which a circular mold table is utilized. For example, molds carried along a non-circular path by a moving belt could be loaded by means of the present mechanism.

Variations may be made in the exact form of the loading mechanism; for example, the paddles could be carried in a non-circular path along the periphery of an endless belt.

It is, accordingly, intended that the present invention be limited only by the scope of the appended claims.

What is claimed is:

1. Apparatus for molding glass which comprises a series of molds attached to a table which is horizontally rotatable about a first axis, said molds being at equal distances from said axis, means for rotating said table about said first axis to impart a predetermined linear velocity to said molds and to move said molds in succession through a loading zone, a plurality of paddles having substantially vertical surfaces as their trailing surfaces revolvable above said molds about a second axis, means for revolving said paddles about said second axis in succession through said loading zone with linear velocities equal to said predetermined linear velocity, means for synchronizing a paddle over each of said molds as it passes through said loading zone, and a chute having a discharge end above the entrance to said loading zone and facing in the general direction of motion of said paddles in said loading zone and facing said trailing surfaces at said loading zone.

2. Apparatus according to claim 1 which includes means for depositing a succession of charges of molten glass on said chute.

References Cited in the file of this patent
UNITED STATES PATENTS

| | | |
|---|---|---|
| 1,191,868 | Bowman | July 18, 1916 |
| 2,199,356 | Brown | Apr. 30, 1940 |
| 2,271,004 | Gray | Jan. 27, 1942 |